(12) United States Patent
Kim et al.

(10) Patent No.: US 7,667,925 B2
(45) Date of Patent: Feb. 23, 2010

(54) HARD DISK DRIVE

(75) Inventors: Yu-Sung Kim, Seoul (KR); Myung-Il Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 434 days.

(21) Appl. No.: 11/586,608

(22) Filed: Oct. 26, 2006

(65) Prior Publication Data

US 2007/0133122 A1 Jun. 14, 2007

(30) Foreign Application Priority Data

Dec. 10, 2005 (KR) ...................... 10-2005-0121196

(51) Int. Cl.
 *G11B 33/08* (2006.01)
(52) U.S. Cl. ................. 360/97.02; 361/679.34
(58) Field of Classification Search .............. 360/97.01, 360/97.02; 361/685
See application file for complete search history.

(56) References Cited

U.S. PATENT DOCUMENTS

| 6,166,901 | A  | * | 12/2000 | Gamble et al. | ............... | 361/685 |
| 6,377,448 | B1 | * | 4/2002  | Liu et al.    | .................... | 361/685 |
| 6,583,949 | B2 | * | 6/2003  | Maiers        | .................... | 360/97.01 |

FOREIGN PATENT DOCUMENTS

| JP | 5-90687 | | 12/1993 |
| JP | 9-251765 | | 9/1997 |
| JP | 09-251765 | * | 9/1997 |
| KR | 1020050091532 A | | 9/2005 |

* cited by examiner

*Primary Examiner*—Craig A. Renner
*Assistant Examiner*—Tamara Ashford
(74) *Attorney, Agent, or Firm*—Volentine & Whitt, PLLC

(57) ABSTRACT

A hard disk drive includes a base including an installation space and a plurality of sidewalls, the installation space being formed by cutting a predetermined area of the plurality of sidewalls. The hard disk drive also includes a screw housing inserted in the installation space and coupled to the base, wherein the screw housing includes at least one screw hole. The hard disk drive also includes a damper interposed between the base and the screw housing.

15 Claims, 7 Drawing Sheets

HARD DISK DRIVE

BACKGROUND OF THE INVENTION

1. Field of the Invention

The present invention relates generally to a hard disk drive and, more particularly, to a hard disk drive having an improved structure to reduce the damage to a head or disk caused by the direct transfer of an external shock or vibration to a base of the hard disk drive.

This application claims priority under 35 U.S.C. § 119 from Korean Patent Application No. 10-2005-0121196, filed on 10 Dec., 2005, in the Korean Intellectual Property Office, the entirety of which is incorporated herein by reference.

2. Description of Related Art

Hard disk drives (HDDs) are memory devices that are generally used to record and reproduce data by converting digital electric pulses to a magnetic field that is more permanent. HDDs are generally composed of a combination of electronic parts and mechanical parts. Because of their ability, among other things, to provide fast access to large amounts of data, HDDs are widely used as auxiliary memory devices in computer systems.

With the recent increase in TPI (tracks per inch) and BPI (bits per inch), the data storage capacity of HDDs has increased. Therefore, the application field of HDDs has also increased. For example, a compact HDD having a diameter of 0.85 inches, i.e., a size similar to a coin, has been developed recently and is expected to be used in mobile phones in the future. While a HDD has various uses, the HDD is more susceptible to vibrations and shocks compared to other memory devices. Various efforts have been directed towards studying and remedying this problem.

In the structure of a typical HDD, the HDD includes a disk pack, a head stack assembly (HSA) which reads data from the disk while pivoting upon a predetermined pivot shaft above the disk, a printed circuit board assembly (PCBA) which has a printed circuit board (PCB) on which most circuit parts are mounted and which controls the above-described elements, a base on which the above-described elements are assembled, and a cover covering the upper portion of the base. The disk pack has a disk to record and store data.

A plurality of screw holes to which a plurality of screws are screw coupled, are formed at both side walls of the base. The screw holes are used to couple the HDD to a bracket of a notebook PC when the HDD is installed in the notebook PC. Alternatively, the screw holes may be used to couple the HDD to a jig of a test equipment when performing a shock and vibration test.

FIG. 1 is a perspective view illustrating a conventional HDD being assembled to a notebook PC. Referring to FIG. 1, an HDD 101 is installed in a notebook PC (not shown) by passing a screw 103 through a hole formed in a bracket 105 of the notebook PC. In particular, the screw 103 is coupled to a screw hole 104 formed in a side wall of a base 110 of the HDD 101. Because both the screw 103 and the base 110 where the screw hole 104 is formed are made of metal, when an external shock or vibration is applied to the notebook PC, the shock or vibration is directly transferred to the base 110 via the screw 103. This shock or vibration that is transferred to the base 110 may damage a head (not shown) or a disk installed on the base 110.

Typically, HDDs must pass a shock or vibration test to guarantee stability against a shock or vibration. FIG. 2 is a plan view illustrating another conventional HDD that is coupled to a jig of a shock and vibration test equipment in order to perform a shock and vibration test of a HDD. Referring to FIG. 2, for a shock and vibration test, an HDD 201 is fixed to a test equipment that applies a shock and vibration. A screw 203 is screw coupled to a screw hole 204 formed in a side wall of a base 210 of the HDD 201. Because the screw 203 fixing the HDD 201 to a jig 207 is directly coupled to the screw hole 204 of the base 210 of the HDD 201, all the shock or vibration applied by the test equipment is transferred to the HDD 201.

Thus, as described above, in a conventional HDD, because the base of the HDD is directly coupled to the bracket of the notebook PC, any shock or vibration applied to the PC is directly transferred to the base through the screw hole formed therein. This shock or vibration may damage the head or disk of the HDD. Furthermore, as also described above, the same problem may occur when the base of the HDD is directly coupled to the jig of a shock and vibration equipment.

The present disclosure is directed towards overcoming one or more of the shortcomings associated with the conventional HDD.

BRIEF SUMMARY

One aspect of the present disclosure includes a hard disk drive. The hard disk drive includes a base including an installation space and a plurality of sidewalls, the installation space being formed by cutting a predetermined area of the plurality of sidewalls. The hard disk drive also includes a screw housing inserted in the installation space and coupled to the base, wherein the screw housing includes at least one screw hole. The hard disk drive also includes a damper interposed between the base and the screw housing.

Yet another aspect of the disclosure includes a hard disk drive. The hard disk drive includes a base including an installation space and a pair of sidewalls, the installation space being formed by cutting a predetermined area of each of the pair of sidewalls. The hard disk drive also includes a screw housing inserted in the installation space and coupled to the base, wherein the screw housing includes at least one screw hole and the screw housing is formed of a material that is different than a material forming the base.

BRIEF DESCRIPTION OF THE DRAWINGS

The above and/or other aspects of the present invention will become apparent and more readily appreciated from the following detailed description, taken in conjunction with the accompanying drawings of which.

DETAILED DESCRIPTION OF EXEMPLARY EMBODIMENTS

Figure 1:
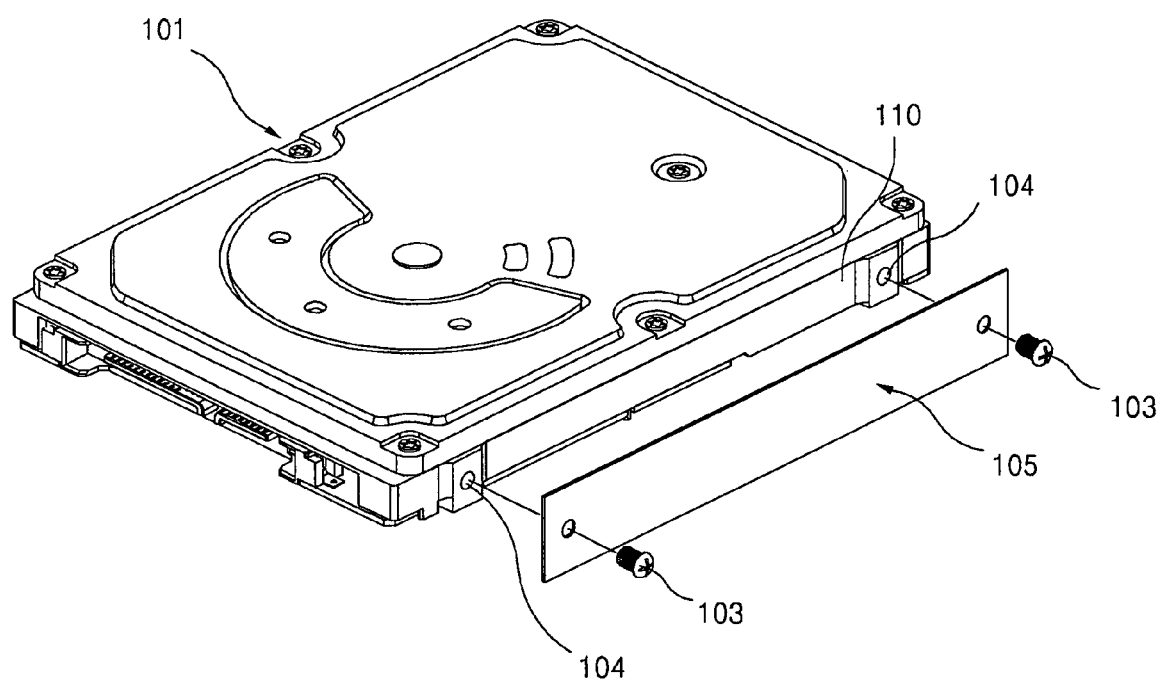
FIG. 1 is a perspective view illustrating a conventional HDD being assembled to a notebook PC.
Figure 2:
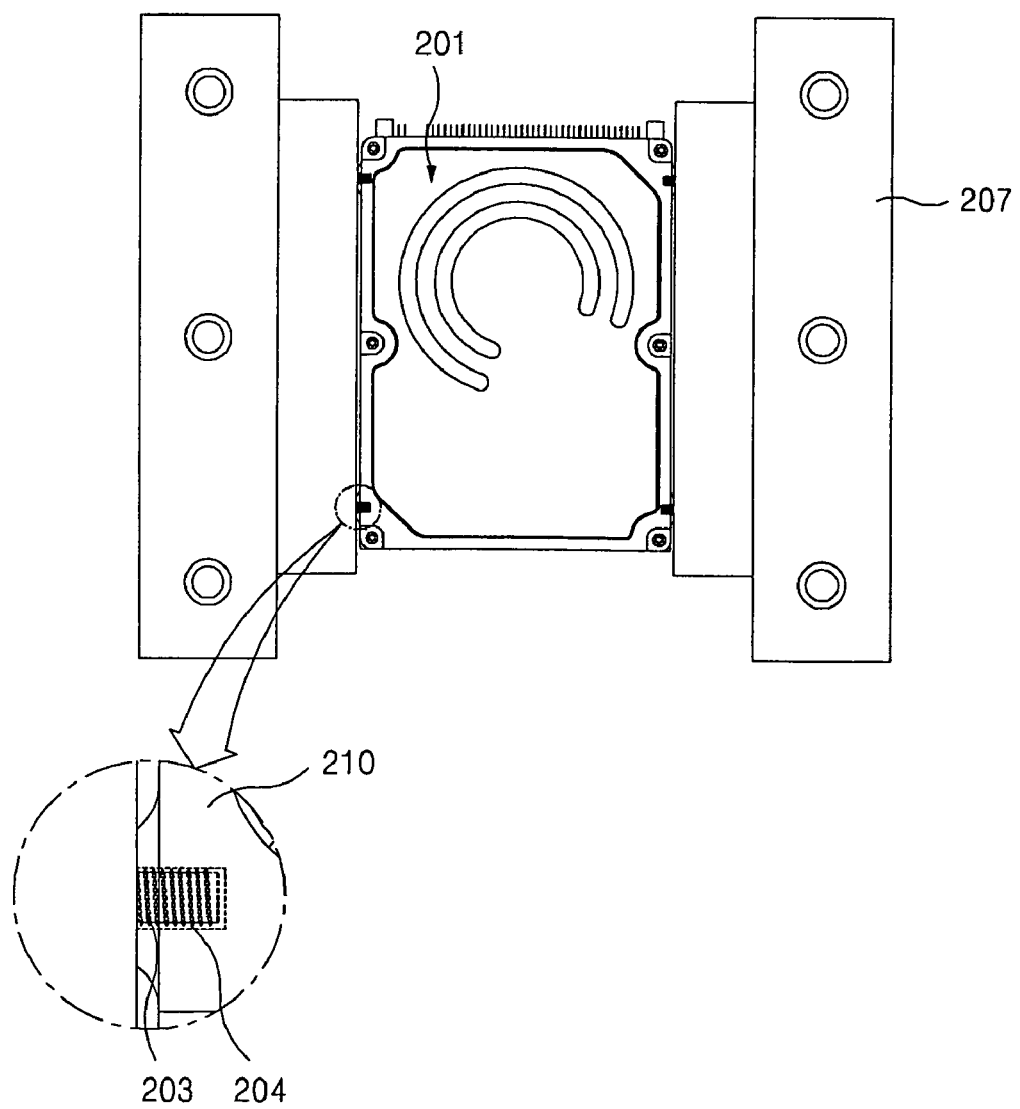
FIG. 2 is a plan view illustrating another conventional HDD being coupled to a jig of a shock and vibration test equipment.
Figure 3:
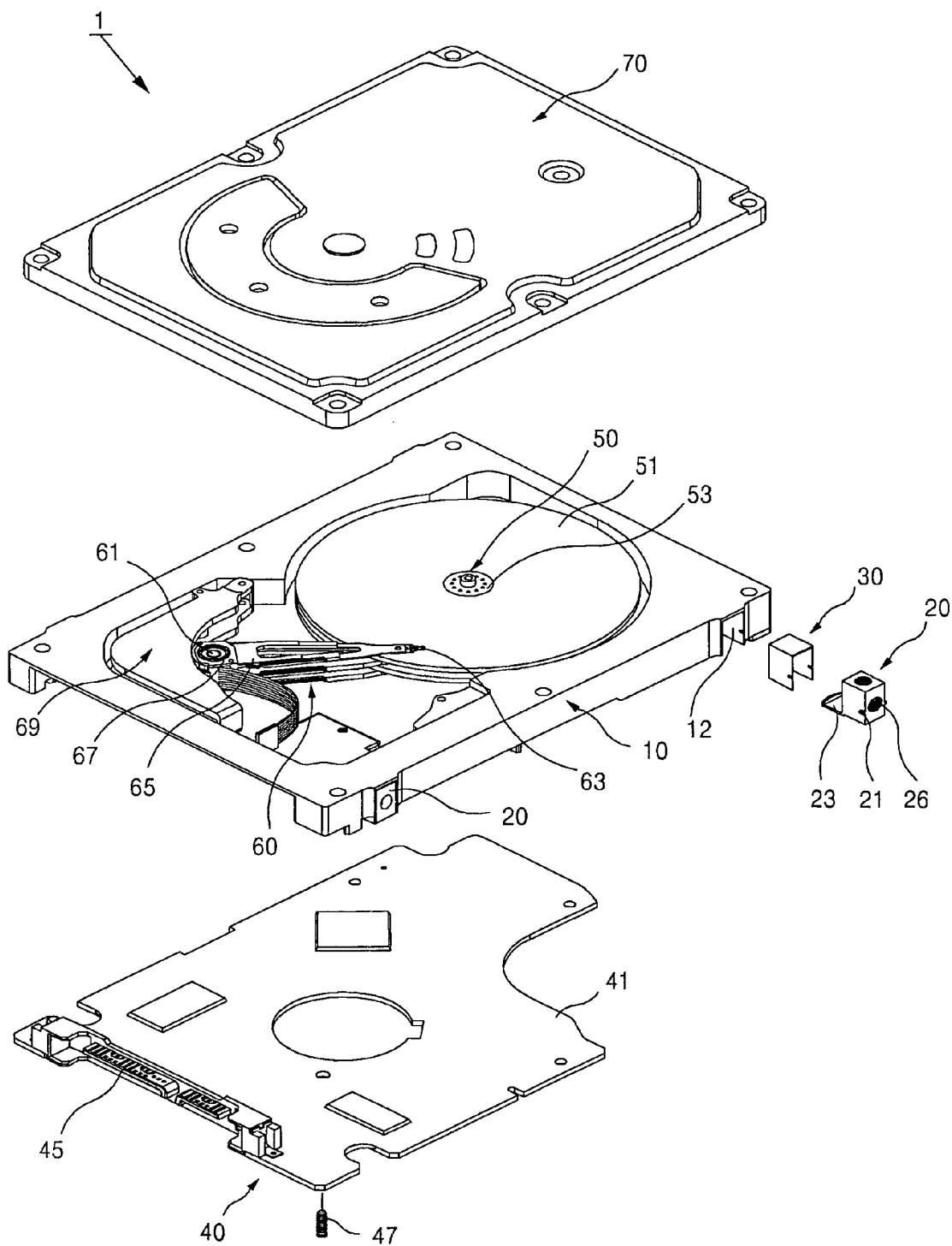
FIG. 3 is an exploded perspective view of a hard disk drive according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Referring to FIGS. 3 through 6, a hard disk drive 1 according to an exemplary embodiment of the present invention includes a base 10, a screw housing 20, a damper 30, a printed circuit board assembly (PCBA) 40 including a printed circuit board (PCB) 41, a disk pack 50 including a plurality of disks 51, a head stack assembly (HSA) 60, and a cover 70. The disk pack 50 is used to record and store data. Furthermore, the disk pack 50 may include a number of other parts (not shown) to fixedly support and rotate the disks 51. The head stack assembly (HSA) 60 is used to read data from the disks 51 while pivoting upon a predetermined pivot shaft 61 above the disks 51. The printed circuit board assembly (PCBA) 40 having the printed circuit board (PCB) 41 on which most circuit parts are mounted, may be used to control the above-described elements. In addition, the above-described elements are assembled on the base 10. Furthermore, the screw housing 20 is coupled to the base 10. In addition, the damper 30 is interposed between the base 10 and the screw housing 20. Furthermore, the cover 70 covers the base 10.

The disk pack 50 which rotates the disks 51, also includes a spindle motor hub (not shown) supporting the disks 51, a spacer (not shown) separating the disks 51, a clamp screw (not shown) coupled to the spindle motor hub, and a clamp 53 elastically pressing the disks 51 by being pressed by the clamp screw.

In the structure described above, the disks 51 fixed to the spindle motor hub are rotated with the spindle motor hub according to the rotation of the spindle motor hub. That is, an electromagnetic force is generated by the interaction of a stator core (not shown) and a magnet (not shown) installed on the spindle motor hub. As the spindle motor hub is rotated by the generated electromagnetic force, the disks 51 fixed to the spindle motor hub are rotated at the same time.

The HSA 60 includes a head 63, an actuator arm 65, a pivot shaft holder 67, a bobbin (not shown), and a voice coil motor (VCM) 69. The head 63 may be used as a carriage for recording data on the disks 51 or reading the recorded data. The actuator arm 65 may be used to pivot on the predetermined pivot shaft 61 above the disks 51 to allow the head 63 to access data on the disks 51. The pivot shaft holder 67 may rotatably support the pivot shaft 61 to which the actuator arm 65 is coupled. The bobbin extends from the pivot shaft holder 67 in the opposite direction of the actuator arm 65. The voice coil motor (VCM) coil is wound around the bobbin to be interposed between magnets (not shown) of the VCM 69.

The VCM 69 is a type of drive motor that pivots the actuator arm 65 to move the head 63 to a desired position on the disks 51 by using Fleming's left hand rule. Fleming's left hand rule is the principle that a force is generated when current flows through a conductive body existing in a magnetic field. Therefore, as current is applied to the VCM coil interposed between the magnets, a force is applied to the bobbin to move the bobbin. Accordingly, the actuator arm 65 that extends opposite to the bobbin from the pivot shaft holder 67 pivots so that the head 63 supported at the end of the actuator arm 65 moves across the disks 51 that are rotating, to search and access tracks. Thus, information is accessed from the tracks on the disks 51. In addition, the accessed information undergoes signal processing.

The PCBA 40 includes the PCB 41 and PCB connector 45. The PCB 41 has a plate shape and a PCB connector 45 is provided at one side of the PCB 41. The PCB connector 45 enables transmission and reception of an external signal. In addition, a plurality of chips (not shown) and circuits that are used to control the disks 51 and the head 63 are provided on the PCB 41.

Figure 4:
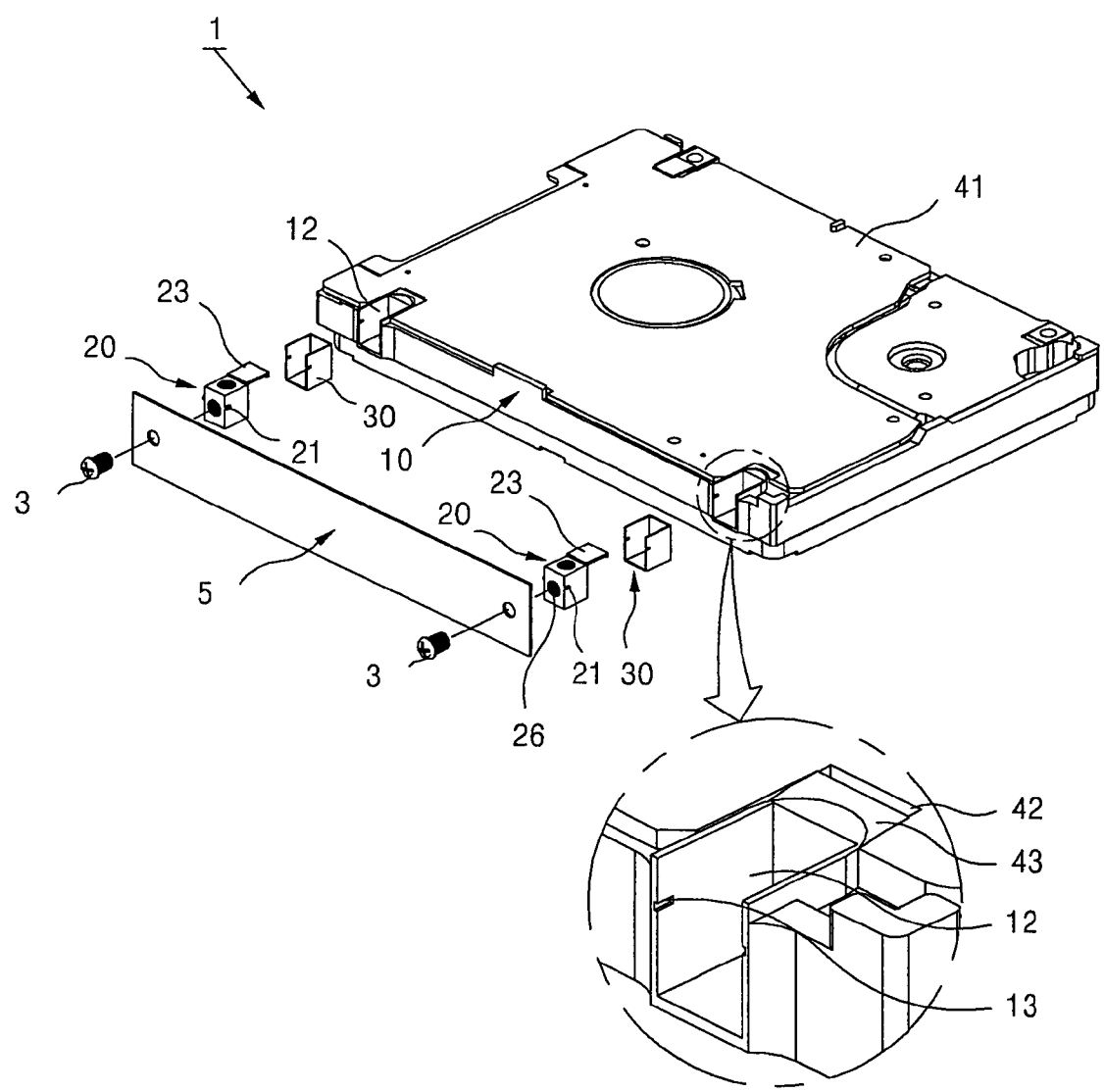
FIG. 4 is a partially exploded perspective view illustrating the hard disk drive of FIG. 3 being coupled to the bracket of a notebook PC.

As shown in FIG. 4, HDD 1 also includes a locking groove 42. In addition, the HDD 1 also includes a locking hook 23 which is part of the screw housing 20 and which will be described in detail later. The locking groove 42 into which the locking hook 23 fits is formed in a rear wall of the PCBA 40. As the screw housing 20 is coupled to the base 10, the locking hook 23 fits into the locking groove 42 so that the PCBA 40 is coupled to the base 10 more firmly. Because the locking hook 23 fits into the locking groove 42, the number of coupling screws 47 that are needed to couple the PCBA 40 to the base 10 can be reduced compared to the conventional technology.

A guide inclined surface 43 is formed to have a predetermined width at the rear wall of the PCBA 40. In addition, the guide inclined surface 43 is inclined such that the thickness of the PCBA 40 gradually increases from the side end of the PCBA 40 adjacent to the screw housing 20 toward the locking groove 42. This change in thickness is to facilitate the smooth approach of the locking hook 23 towards the locking groove 42 of the PCBA 40 when the screw housing 20 is inserted in an installation space 12 (which will be described later,) to be coupled to the base 10.

The base 10 forming a frame is typically formed of aluminum. The base 10 may be configured to hold a number of components. In particular, the base 10 may be configured to hold at least the disk pack 50, the HSA 60, and the PCBA 40. The installation space 12 that is made by cutting out a predetermined area is formed at four positions at both side wall portions of the base 10. In an exemplary embodiment, the screw housing 20 is fit into the installation space 12 by being forcibly inserted thereto.

An escape prevention groove 13 is concavely formed in the surface of an inner wall of the base 10 to have predetermined depth and length. An escape prevention rib 21 is formed on the screw housing 20 and fits into the escape prevention groove 13 when the screw housing 20 is inserted in the installation space 12 of the base 10 to fit into the base 10. Because the escape prevention rib 21 of the screw housing 20 fits into the escape prevention groove 13 of the base 10, even when a severe shock is applied to the HDD 1, the screw housing 20 is prevented from escaping from the base 10.

As described above, the screw housing 20 is inserted in the installation space 12 of the base 10 to fit into the base 10. For this purpose, the width of the screw housing 20 is manufactured smaller by about 1 mm than the width of the installation space 12 of the base 10. The fitting between the screw housing 20 and the base 10 firms the coupling of the screw housing 20 and the base 10. In particular, the fitting between the escape prevention rib 21 of the screw housing 20 and the escape prevention groove 13 of the base 10 firms the coupling of the screw housing. Although, in an exemplary embodiment, the screw housing 20 fits into the base 10, the screw housing 20 can be coupled to the base 10 using an adhesive. That is, the screw housing 20 is coupled to the damper 30 using an adhesive and the damper 30 can also be coupled to the base 10 using an adhesive.

Similar to the base 10, the screw housing 20 is also manufactured of aluminum. Furthermore, a screw hole 26 is formed in each of the side wall and lower wall of the screw housing 20. The screw hole 26 is generally used to assemble the HDD 1 with an external structure. Thus, for example, when the HDD 1 is coupled to a notebook PC or a shock and vibration test equipment, a screw 3 is screw coupled to the screw hole 26 bypassing the bracket 5 of the notebook PC or the jig of the test equipment. In addition, the escape prevention rib 21 of the screw housing 20 that is coupled to the escape prevention groove 13 of the base 10 protrudes from both lateral surfaces of the screw housing 20 to a predetermined height.

The locking hook 23 of the screw housing 20 extends from the rear end portion of the lower wall of the screw housing 20. Although in the disclosed embodiment the locking hook 23 is integrally formed with the screw housing 20, the locking hook 23 can also be provided separately and be coupled to the screw housing 20. As described above, as the locking hook 23 fits into the locking groove 42 in the rear wall of the PCBA 40, the fixing force of the PCBA 40 with respect to the base 10 can be strengthened. Thus, as also mentioned above, the fitting between the locking hook 23 and the locking groove 42 may also help reduce the number of coupling screws 47 needed for coupling the PCBA 40 to the base 10. In addition, other features such as, for example, a reduced assembly time for the HDD 1 is also possible because of the fitting between the locking hook 23 and the locking groove 43.

Figure 5:
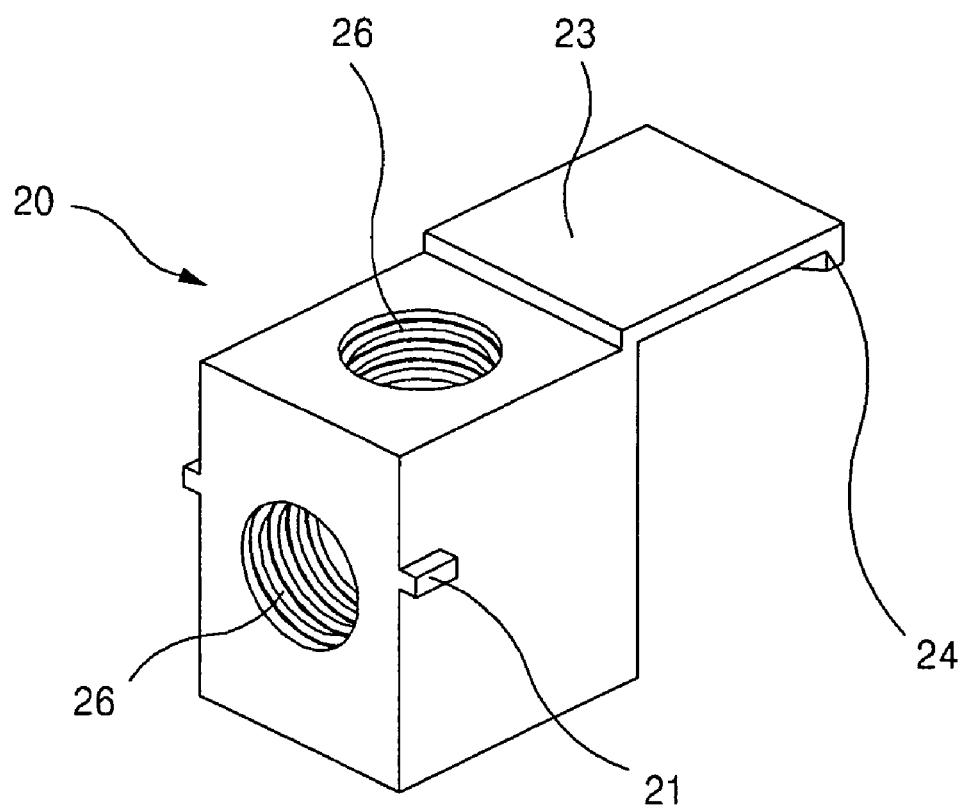
FIG. 5 is a perspective view of the screw housing of the hard disk drive of FIG. 3.

As shown in FIG. 5, in an exemplary embodiment, the locking hook 23 extends from the rear end portion of the lower wall of the screw housing 20 and bends upward at an end portion thereof, thus having an L-shaped section. Also, the locking hook 23 has a curved shape bulged downwards such that an end tip portion 24 contacting the PCBA 40 has a smaller contact area with the PCBA 40 when the screw housing 20 is assembled with the base 10. The curved shape, with the guide inclined surface 43 of the PCBA 40, may provide a smoother approach of the locking hook 23 to the locking groove 42 when the screw housing 20 is inserted into the installation spacer 12 of the base 10.

Referring back to FIG. 4, the damper 30 is interposed between the base 10 and the screw housing 20. Furthermore, the damper 30 is manufactured of a rubber-like material. The rubber material may help the damper 30 absorb an external shock transferred through the screw 3 coupled to the screw hole 26. That is, as the damper 30 which is made of a rubber material is inserted in an allowance between the base 10 and the screw housing 20, when a shock and vibration is transferred to the HDD 1 from the outside, the shock and vibration transferred to the HDD 1 is reduced by the damper 30. Thus, the HDD 1 may not be as susceptible to shocks and/or vibrations as compared to conventional HDDs. This would be the case irrespective of whether the HDD 1 is in a non-operational state or in an operational state during a shock and vibration test.

Figure 6:
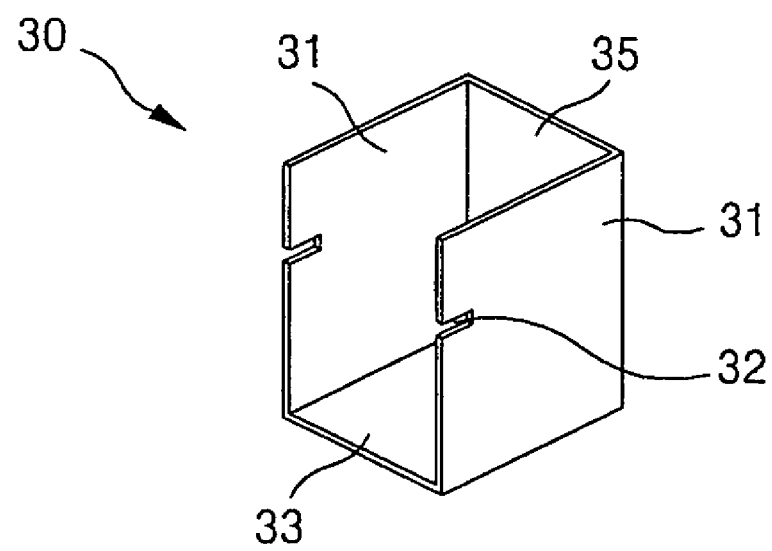
FIG. 6 is a perspective view of the damper of the hard disk drive of FIG. 3.

FIG. 6 illustrates a structure of the damper 30 according to an exemplary embodiment. As shown in FIG. 6, the damper 30 includes a pair of damper side walls 31 interposed between the side walls of the screw housing 20 and the base 10, a damper upper wall 33 interposed between the upper wall of the screw housing 20 and the base 10 and connecting the damper side walls 31, and a damper rear wall 35 interposed between the rear wall of the screw housing 20 and the base 10 and connecting the damper side walls 31. In addition, a cut portion 32 is provided on the damper side walls 31. The cut portion 32 is formed by cutting a predetermined area of each of the damper side walls 31. The cut portion 32 prevents the damper 30 from interfering with the coupling between the escape prevention rib 21 and the escape prevention groove 13.

Thus, the escape prevention rib 21 can be smoothly coupled to the escape prevention groove 13 in spite of the existence of the damper 30.

In the operation of the HDD, according to an exemplary embodiment, the screw housing 20 is coupled to the installation space 12 formed at both side walls of the base 10. In doing so, the damper 30 made of a rubber material is interposed between the screw housing 20 and the base 10. Because the width of the screw housing 20 is slightly greater than that of the installation space 12 of the base 10, when the screw housing 20 fits into the installation space 12 of the base 10, the damper 30, which is made of a rubber-like material, is elastically deformed.

When the HDD 1 assembled as above is screw coupled to the bracket 5 of a notebook PC using the screw 3 and then an external shock or vibration is applied to the notebook PC, the external shock or vibration transferred to the screw housing 20 is absorbed by the damper 30 interposed between the screw housing 20 and the base 10. This absorption of the shock or vibration by the damper 30 may help protect components such as the head 63 and disks 51 of the HDD 1.

Likewise, when the HDD 1 assembled as above is fixed to a test equipment that applies a shock or vibration, the shock or vibration applied to the test equipment is not directly transferred to the HDD 1. Instead, the shock or vibration is absorbed by the damper 30 interposed between the screw housing 20 and the base 10. Thus, the damage to the head 63, the disks 51, and the motor can be reduced not only in a non-operation state but also in an operation state during the HDD shock and vibration test.

Figure 7:
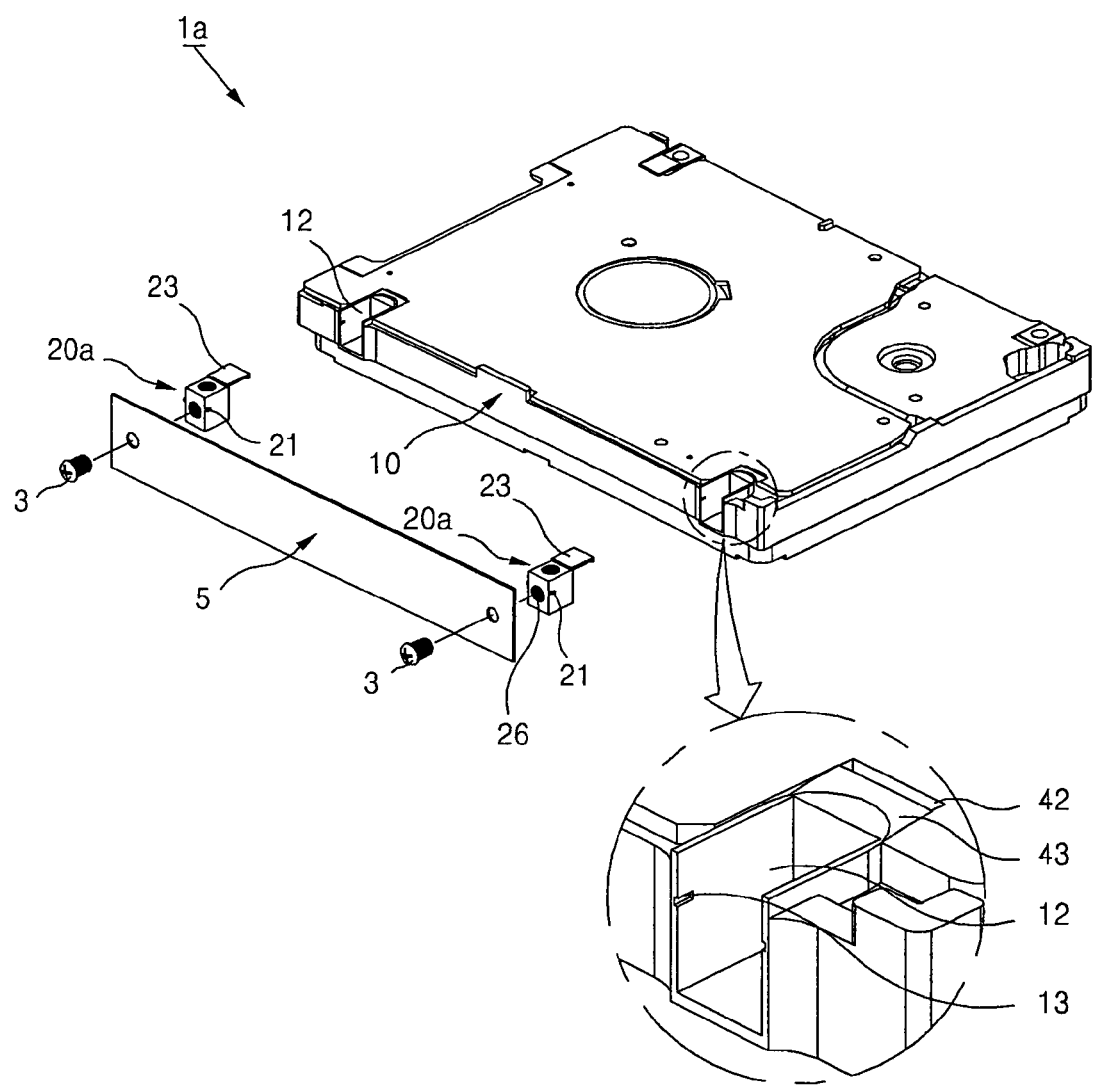
FIG. 7 is a partially exploded perspective view of a hard disk drive according to an alternative exemplary embodiment of the present invention.

FIG. 7 is a partially exploded perspective view of a hard disk drive according to another exemplary embodiment of the present invention. In the following description, only the portions that are different from the previous embodiment are described. When necessary, the same reference numerals are used for the same elements as the previous embodiment while a reference numeral with a suffix of "a" is used for a different element.

As shown in FIG. 7, in an exemplary embodiment, a screw housing 20a is manufactured of a material having a property that is different than that of the material used to manufacture the base 10. In an exemplary embodiment, the screw housing 20a is manufactured of a synthetic resin that has elasticity such as, for example, polycarbonate (PC), so that the external shock and vibration transferred through the screw 3 coupled to the screw hole 26 is absorbed. Thus, the damper 30 of FIG. 4 made of a rubber material in the previous embodiment is omitted in the present embodiment. However, even when the screw housing 20a is manufactured of synthetic resin having elasticity that is different from a property of the base 10, a damper made of a rubber material may be added to improve a shock and vibration characteristic.

Although in the previous embodiment, the damper 30 includes the damper side wall 31, the damper upper wall 33, and the damper rear wall 35, the damper 30 can be embodied to have a variety of structures which can appropriately absorb a shock and vibration transferred from the screw housing 20.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the following claims and their equivalents.

What is claimed is:

1. A hard disk drive comprising:
   a base including a plurality of installation spaces and a plurality of sidewalls, each installation space being formed by cutting a predetermined area of the plurality of sidewalls;
   a screw housing inserted in each of the installation spaces and coupled to the base, wherein the screw housing includes at least one internal thread defining at least one screw hole; and
   dampers interposed between the base and the screw housings,
   wherein each of the screw housings has opposite sidewalls, and an escape prevention rib protruding from the side walls of the screw housing, and the base has an escape prevention groove extending therein and open at one of the sidewalls of the base, the escape prevention rib being received in the escape prevention groove.

2. The hard disk drive of claim 1, further comprising a printed circuit board assembly (PCBA) including a printed circuit board (PCB), wherein a side of the PCBA is adjacent each of the screw housings, the PCBA includes a rear wall having locking grooves therein, and each of the screw housings further includes a locking hook received in a respective one of the locking grooves in the rear wall of the PCBA so as to hook the screw housing onto the PCBA.

3. The hard disk drive of claim 2, wherein the locking hook has a first section extending from a rear end portion of a lower wall of the screw housing and an end portion bent upward from the first section, the width of the end portion of the locking hook decreasing towards a tip thereof.

4. The hard disk drive of claim 2, wherein the rear wall of the PCBA has a bottom surface and guide surfaces leading to the locking grooves, respectively, each of the guide surfaces being inclined relative to the bottom surface in such a direction that a thickness of the PCBA increases from the side of the PCBA adjacent to the screw housing towards the locking groove in which the locking hook of the screw housing is received.

5. The hard disk drive of claim 1, wherein each damper has a pair of side walls and the escape prevention rib extends through one of the side walls of each damper.

6. The hard disk drive of claim 1, wherein the screw housing is adhered to each damper, and each damper is adhered to the base.

7. A hard disk drive comprising:
   a base including a plurality of installation spaces and a pair of sidewalls, each installation space being formed by cutting a predetermined area of each of the pair of sidewalls; and
   screw housings inserted in each of the installation spaces and coupled to the base, wherein each screw housing includes at least one internal thread defining at least one screw hole and each screw housing is of a material different from that of the base,
   wherein each of the screw housings has opposite sidewalls, and an escape prevention rib protruding from the side walls of the screw housing, and the base has an escape prevention groove extending therein and open at one of the sidewalls of the base, the escape prevention rib being received in the escape prevention groove.

8. The hard disk drive of claim 7, wherein each of the screw housings is of a synthetic resin that has elasticity to absorb a shock transferred through a screw when the screw mates with the internal thread of the screw housing.

9. The hard disk drive of claim 7, further comprising a damper interposed between the base and each of the screw housings.

10. The hard disk drive of claim 9, wherein the damper comprises:
    a pair of damper side walls interposed between side walls of the screw housing and the base;
    a damper upper wall interposed between an upper wall of the screw housing and the base and connecting the pair of damper side walls; and
    a damper rear wall interposed between a rear wall of the screw housing and the base and connecting the pair of damper side walls.

11. The hard disk drive of claim 7, further comprising a printed circuit board assembly (PCBA) including a printed circuit board (PCB), wherein a side of the PCBA is adjacent each of the screw housings, the PCBA includes a rear wall having locking grooves therein, and each of the screw housings further includes a locking hook received in a respective one of the locking grooves in the rear wall of the PCBA so as to hook the screw housing onto the PCBA.

12. The hard disk drive of claim 11, wherein the locking hook has a first section extending from a rear end portion of a lower wall of the screw housing and an end portion bent upward from the first section, the width of the end portion of the locking hook decreasing towards a tip thereof.

13. The hard disk drive of claim 11, wherein the rear wall of the PCBA has a bottom surface and guide surfaces leading to the locking grooves, respectively, each of the guide surfaces being inclined relative to the bottom surface in such a direction that a thickness of the PCBA increases from the side of the PCBA adjacent to the screw housing towards the locking groove in which the locking hook of the screw housing is received.

14. The hard disk drive of claim 7, wherein the damper has a pair of side walls and the escape prevention rib extends through one of the side walls of the damper.

15. The hard disk drive of claim 7, wherein the screw housing is adhered to the base.

* * * * *